Sept. 27, 1932.      G. R. HANNAN ET AL      1,879,216
GLARE SHIELD
Filed April 7, 1931      2 Sheets-Sheet 1
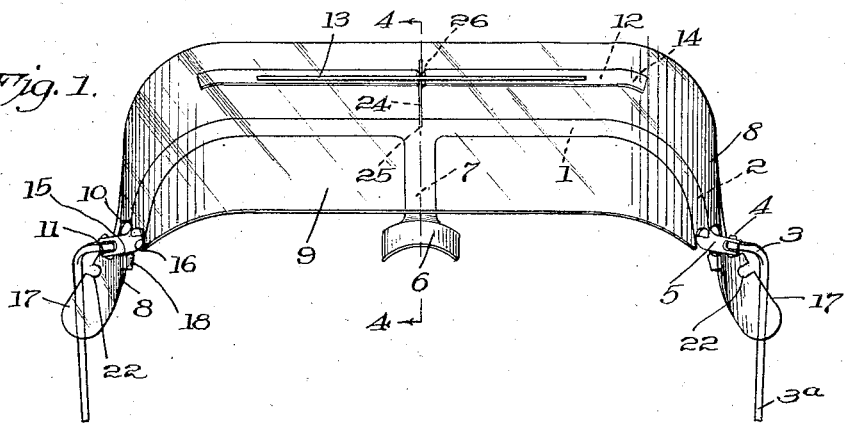
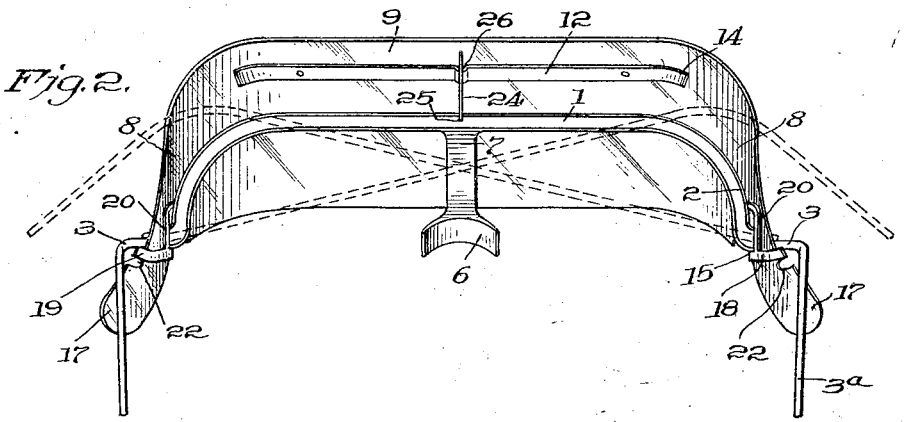
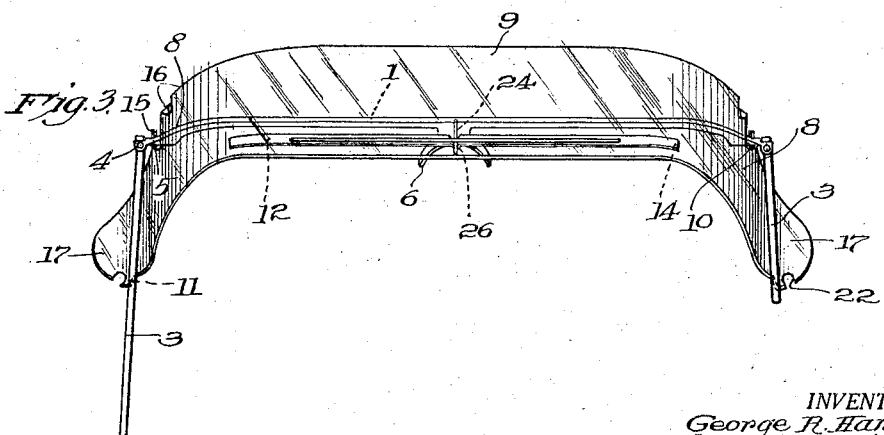
INVENTORS:
George R. Hannan,
Rutherford G. Goldman,
BY
ATTORNEY.

Sept. 27, 1932.  G. R. HANNAN ET AL  1,879,216
GLARE SHIELD
Filed April 7, 1931   2 Sheets-Sheet 2
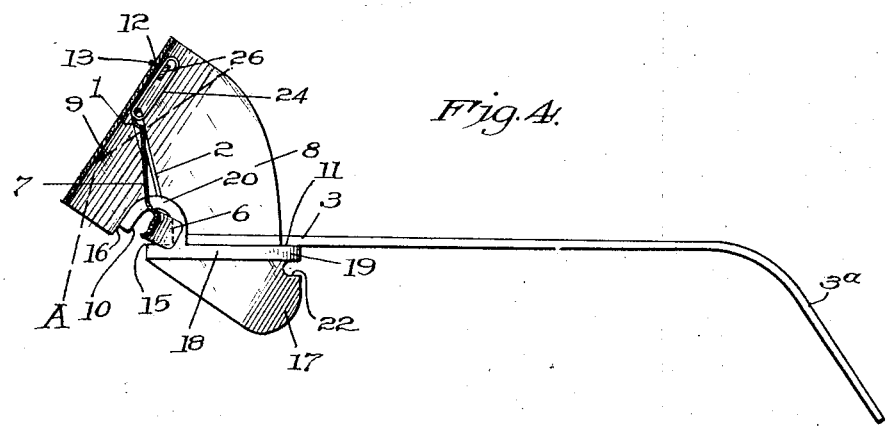
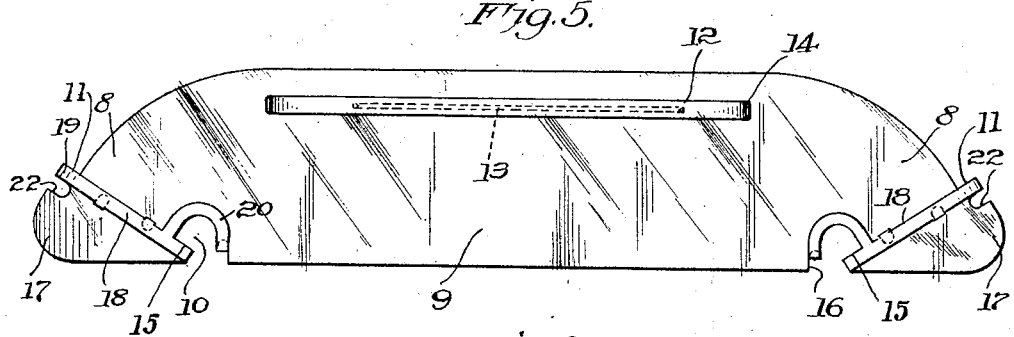
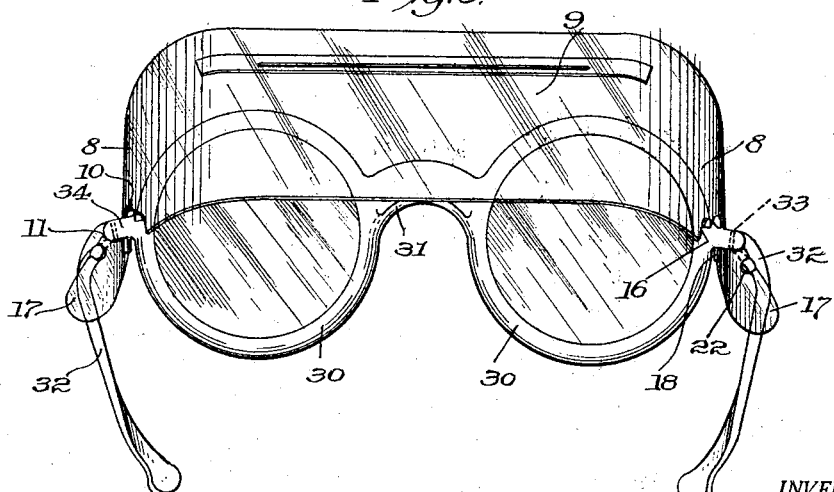
INVENTORS:
George R. Hannan,
Rutherford G. Goldman,
BY
ATTORNEY.

Patented Sept. 27, 1932

1,879,216

UNITED STATES PATENT OFFICE

GEORGE R. HANNAN AND RUTHERFORD G. GOLDMAN, OF LOS ANGELES, CALIFORNIA, ASSIGNORS, BY DIRECT AND MESNE ASSIGNMENTS, TO H. T. BARLOW, OF LOS ANGELES, CALIFORNIA

GLARE SHIELD

Application filed April 7, 1931. Serial No. 528,270.

This invention is a shield adapted to protect the eyes against glare, and has for its object to provide a shield adapted for mounting on a supporting frame extending across the face adjacent the eyes and held in place by hinged ear-pieces as in a usual spectacle frame, with the shield protecting the eyes against glare from both above and from the sides while at the same time providing for unobstructed forward vision, and the shield adapted to form a flat strip when not in use, with the hinged ear-pieces of the supporting frame folded against the frame so that the entire structure may be conveniently carried in the pocket.

It is a further object of the invention to adapt the shield to be readily bent from a flat strip to a substantialy bowed structure, whereby the ends of the strip may be hooked onto the supporting frame, with inherent resiliency of the bent strip securely holding it in operative position until intentionally released, and said bent strip overlying and projecting forwardly and downwardly in front of the supporting frame with its ends extending rearwardly alongside the frame so as to cut-off glare from the sides, and the upper edge of the strip fitting snugly against the frame so as to cut-off glare from above, and the strip resting upon the frame where the ends of the strip start to curve rearwardly, so that the resilient ends of the strip by hooking under the ear-pieces of the frame securely hold the shield in place.

It is a still further object of the invention to adapt the shield for mounting on either a usual spectacle frame having usual lenses forming eyeglasses, or to mount the shield on a skeleton frame without lenses and comprising merely a support for the shield.

It is a still further object of the invention to adapt the shield for adjustment with relation to its supporting frame so as to cut-off more or less glare, and, particularly in the case of a mere skeleton supporting frame, to adapt the frame for ready adjustment so as to fit the particular user.

Further objects of the invention will be readily understood from the following description of the accompanying drawings, in which:

Fig. 1 is a front elevation of the shield operatively mounted on a skeleton frame.

Fig. 2 is a rear elevation of the same.

Fig. 3 is a top plan view of the same structure.

Fig. 4 is a vertical section on the line 4—4 of Fig. 1.

Fig. 5 is a plan view of the shield in its inoperative position.

Fig. 6 is a view similar to Fig. 1 but showing the shield mounted on a spectacle frame.

In Figs. 1 to 4 the glare shield is shown mounted on a supporting frame which is a mere skeleton frame for supporting the shield and having no lenses forming spectacles; and the frame is adapted to extend across the face adjacent the eyes, with the frame supported on the bridge of the nose and having hinged ear-pieces adapted to engage the ears. For this purpose the frame is illustrated as comprising a transverse strip 1 downwardly curved at its ends as shown at 2, with ear-pieces 3 hinged at 4 to the lateral projections 5 at the ends of the transverse strip 1, and a nose piece 6 suspended medially from said transverse strip by a depending strip 7. The frame is thus adapted for positioning with strip 1 extending across the face above the eyes, with the lateral projections 5 lying in a horizontal plane approximately bisecting the eyes, and the ear-pieces 3 extending rearwardly alongside the head and engaging the ears in usual manner.

The frame is preferably of material which is substantially rigid against accidental distortion but adapted for intentional bending so as to fit the frame to the user. Thus for example the frame may be of a somewhat pliable metal, adapting the strip 1 to be bent so as to fit fairly snugly across the face above the eyes, and adapting the suspension strip 7 for the nose piece and the curved ends 2 of the transverse strip to be bent so as to properly vertically position the strip 1 and the lateral projections 5, with the ear engaging rear ends 3a of the hinged ear-pieces 3 being similarly bent to fit the ear-pieces to the ears.

The shield comprises an elongated strip of material, which when not in use lies substantially flat as shown in Fig. 5, so that with either the supporting frame folded but still attached to the strip, or with the strip completely disengaged from its folded supporting frame, the entire structure may be slipped into the pocket and carried without occupying any appreciable space.

When in use the strip comprising the shield is adapted to have its ends 8 bent rearwardly with relation to its medial portion 9 so that said medial portion of the strip may be positioned at an angle projecting forwardly and downwardly in front of transverse strip 1, with notches 10 which are formed in the lower edge of the strip at the junction of its rearwardly bent ends with its medial portion detachably engaging the lateral projections 5 of the supporting frame, and said bent ends of the strip lying inside the ear-pieces 3 and projecting therebelow with shoulders 11 at the rear edges of said bent ends hooking under the ear-pieces and releasably held in engagement therewith by inherent resiliency of the bent ends 8 tending to swing the same outwardly to their normal flat position.

The shield is thus adapted to shield the eyes from glare from above and from the sides, and for this purpose may be transparent and of such color, green for example, as will intercept glare; and in order to provide the desired inherent resiliency for the strip which comprises the shield, it may be of a material such as celluloid.

When in operative position the medial portion 9 of the shield instead of following a gradual curve between its rearwardly bent ends 8, is preferably substantially flat with its ends 8 relatively abruptly rearwardly curving as shown in Fig. 3, so that the flat medial portion fits snugly adjacent the transverse strip 1 and follows the substantially transverse plane of said strip for intercepting all glare from above which may be directed downwardly toward the eyes. As an instance of this arrangement a transverse reinforcing strip 12 is preferably secured to the inner surface of the medial portion of the shield adjacent its upper edge, as for example by a retaining wire 13, with the strip 12 preferably of suitable spring metal which while it may be bent, is of such inherent rigidity as to maintain a substantially flat contour except at its ends which normally curve rearwardly slightly. The flat medial portion 12 of the reinforcing strip thus holds the medial portion 9 of the shield in the desired substantially flat plane, and the slightly curved ends 14 of the reinforcing strip prevent a too abrupt curve at the ends 8 of the shield, such as might otherwise crack the celluloid.

The notches 10 are preferably lipped at their rear edges as shown at 15 so as to hook under the lateral projections 5 of the supporting frame for assisting in retaining the shield in operative position, and the front edges of the notches may be cut away at their outer ends as shown at 16, so as to permit the lateral projections 5 being readily received in the notches. The rear edges of the curved ends 8 which form the shoulders 11, are preferably maintained in slightly outwardly bent position as shown at 17 so as to insure ready operative engagement of the shoulders 11 beneath the ear-pieces 3, and for this purpose reinforcing strips 18 may be secured to the inner surfaces of ends 8 so as to extend across said ends from the notches 10 to the shoulders 11, with said strips preferably of spring metal which while adapted to bend is of such inherent rigidity as to maintain the reinforcing strips in substantially flat planes throughout their lengths except for their outer ends 19 which are bent to a slight outward curvature. The reinforcing strips 18 thus maintain the swinging portions of curved ends 8 in substantially flat planes lying against ear-pieces 3 as shown in Fig. 3, with the edges 17 of said curved ends maintained in outwardly bent position so as to insure hooking engagement of shoulders 11 beneath the ear-pieces.

In order to reinforce the notches 10 and prevent cracking of the shield where the ends 8 curve rearwardly from the medial portion 9, the inner ends of strips 18 preferably completely overlie the lips 15 and are provided with lateral branches 20 which extend all the way around the notches 10 to their cut-away outer ends 16, with the lateral branches 20 through their tendency to assume the same flat planes as the main portions 18 of the reinforcing strips, tending to return the curved ends 8 of the shield to the plane of its flat medial portion 9 as soon as the ends of the shield are disengaged from its supporting frame, and thereby insuring the entire shield lying in a substantially flat plane when not in use.

The shield may be readily operatively mounted by rearwardly bending its ends 8 and engaging the lateral projections 5 of the supporting frame in notches 10 and hooking shoulders 11 under ear-pieces 3; and the parts are preferably so proportioned that with the shield thus operatively mounted its medial portion 9 slants downwardly and outwardly from transverse strip 1 to just above the line of horizontal vision as shown in Fig. 4, thereby in no way obstructing direct vision, and said medial portion of the shield intercepts all glare from above without the necessity of projecting any great distance in advance of its supporting frame, with the angle of the shield such that ends 8 cut off all glare from the sides, and any upward glare which may be reflected from the underside of the medial portion of the shield is not directed into the eyes but is reflected thereabove as shown by broken line A in Fig. 4.

It may be desirable to adjust the angular position of the shield so as to cut-off more or less glare, and for this purpose the rear edges of the curved ends of the shield may be notched below the reinforcing strips 18 as shown at 22, so that the notches 10 engaging lateral projections 5 adapt the shield for swinging adjustment with the notches 22 instead of the shoulders 11 then engaging the ear-pieces 3 and thus supporting the shield in a position slanting downwardly to a greater degree in front of the supporting frame.

The shield, as shown in Fig. 5, may be adapted for complete disengagement from its supporting frame when not in use; or as shown in Figs. 1 to 4 the shield may be attached to transverse strip 1 so as to permit the shield being bent to operative position or release of its ends 8 from engagement with the supporting frame, in order that the shield may lie in a substantially flat plane against the outer surface of the supporting frame with the ear-pieces of the frame folded, thereby permitting the entire structure being slipped into the pocket as a unit.

For this purpose the medial portion of the shield may be linked to the medial portion of transverse strip 1 as shown at 24, with one end of the link pivotally looped through an eye 25 in the transverse strip, and the opposite end of the link adapted for longitudinal and lateral play in an eye 26 which may be formed by the reinforcing strip 12. The link thus holds the shield against complete disengagement from its supporting frame, but permits such limited movement of the shield with relation to the supporting frame as will permit the shield being readily mounted in operative position or folded flat against its supporting frame.

In Fig. 6 we have shown a shield such as previously described, adapted for mounting on usual spectacles, the shield in this case being preferably formed without the link 24 so that the shield is adapted for complete detachment from the spactacles in order that the spectacles may be used with or without the shield. The spectacles comprise usual lens frames 30 connected at their proximate sides by a nose-piece 31 and having ear-pieces 32 hinged at 33 to lateral projections 34 at the distant sides of the lens frames. The shield is mounted on the spectacles as previously described, with notches 10 engaging the lateral projections 34, and the shoulders 11 hooked under the ear-pieces 32.

We have thus provided a glare shield adapted for mounting on either a special skeleton frame or on usual spectacles, with the shield protecting against glare from in front and from the sides, while at the same time permitting unobstructed straight vision, and the shield together with its supporting frame adapted to be readily folded so as to lie flat and thus occupy but little space.

In order to further conserve space when the device is folded, both the skeleton frame shown in Figs. 1 to 4, and the spectacle frame shown in Fig. 6, may have their ear-pieces hinged so that when unfolded they extend rearwardly in substantially horizontal planes, but when folded cross one another at an appreciable angle so as to lie substantially entirely within the area defined by their frame. For this purpose the axes of hinges 4 and 33, instead of being in vertical planes as is usual in the construction of spectacle frames, are inclined as shown in Figs. 1 and 6 so that when the ear-pieces are folded they extend angularly across their frame instead of lying substantially parallel to one another. The depending ear engaging ends of the ear-pieces are thus swung upwardly as shown by broken lines in Fig. 2 so that substantially the entire ear-pieces lie within the area defined by their frame.

As an instance of this arrangement the axes of hinges 4 and 33 may extend transversely of lateral projections 5 and 34 as in usual spectacle construction, but said lateral projections slant downwardly toward their outer ends, whereby the axes of the hinges of either the skeleton frame of Fig. 1 or the spectacle frame of Fig. 6, are downwardly convergently inclined so that the ear-pieces are adapted to swing rearwardly to normal horizontal position, but when folded are adapted to cross one another at an appreciable angle so that substantially the entire ear-pieces lie within the area defined by either the skeleton frame or the spectacle frame.

We claim:

1. In combination, a supporting frame adapted to extend across the face adjacent the eyes and having hinged ear-pieces at its ends adapted to engage the ears, and a shield supported on the frame and projecting outwardly and downwardly in front of the upper portion thereof with the ends of the shield curving rearwardly alongside the frame and lying inside the ear-pieces and resting upon the frame at its hinged connections with the ear-pieces, the curved ends of the shield having shoulders adapted to hook under the ear-pieces.

2. In combination, a supporting frame adapted to extend across the face adjacent the eyes and having hinged ear-pieces at its ends adapted to engage the ears, and a shield supported on the frame and projecting outwardly and downwardly in front of the upper portion thereof with the ends of the shield curving rearwardly alongside the frame and lying inside the ear-pieces with notches in the lower edge of the shield engaging the frame at its hinged connections with the ear-pieces.

3. In combination, a supporting frame adapted to extend across the face adjacent the eyes and having hinged ear-pieces at its ends adapted to engage the ears, and a shield supported on the frame and projecting outwardly and downwardly in front of the upper portion thereof with the ends of the shield curving rearwardly alongside the frame and lying inside the ear-pieces with notches in the lower edge of the shield engaging the frame at its hinged connections with the ear-pieces, the rear edges of the curved ends of the shield having shoulders adapted to hook under the ear-pieces.

4. In combination, a supporting frame adapted to extend across the face adjacent the eyes and having hinged ear-pieces at its ends adapted to engage the ears, and a shield supported on the frame and projecting outwardly and downwardly in front of the upper portion thereof with the ends of the shield curving rearwardly alongside the frame and lying inside the ear-pieces with notches in the lower edge of the shield having lipped open ends adapted for hooked engagement of the notches with the frame at its hinged connections with the ear-pieces.

5. In combination, a supporting frame adapted to extend across the face adjacent the eyes and having hinged ear-pieces at its ends adapted to engage the ears, and a shield supported on the frame and projecting outwardly and downwardly in front of the upper portion thereof with the ends of the shield curving rearwardly alongside the frame and releasably held in position lying inside the ear-pieces with notches in the lower edge of the shield engaging the frame at its hinged connections with the ear-pieces, and resilient reinforcement strips at the margins of said notches adapted to return said curved ends to substantially the plane of the medial portion of the shield when said shield ends are released from their position lying inside the ear-pieces.

6. In combination, a supporting frame adapted to extend across the face adjacent the eyes, a shield projecting outwardly and downwardly in front of the upper portion of the supporting frame with the ends of the shield curving rearwardly and releasably held in position alongside the frame, and a connection between the medial portions of the shield and frame adapting the shield for limited movement with relation to the frame.

7. In combination, a supporting frame adapted to extend across the face adjacent the eyes and having ear-pieces at its end adapted to engage the ears, a shield having its medial portion extending across the front of the frame and pivotally secured thereto with the ends of the shield curved rearwardly around the ends of the frame and alongside the ear-pieces, and means at the rearwardly curved shield ends for releasably holding said curved shield ends in position alongside the ear pieces, said holding means being spaced above the lower edges of the rearwardly curved shield ends so that said shield ends project below the ear-pieces for shielding the eyes against glare from the sides.

8. In combination, a supporting frame adapted to extend across the face adjacent the eyes, a shield supported on the frame and projecting outwardly and downwardly in front of the upper portion thereof with the ends of the shield curving rearwardly and releasably held in position alongside the frame, and a reinforcement strip having its medial portion in a flat plane and extending lengthwise at the medial portion of the shield for holding said medial portion of the shield in a substantially flat plane when the shield is in operative position, the ends of the reinforcement strips being free of and curved rearwardly at the curved areas of the shield and adapted for impingement by said curved areas of the shield for limiting the curvature at the ends of the shield when the shield is in operative position.

9. In combination, a supporting frame adapted to extend across the face adjacent the eyes and having ear-pieces at its end adapted to engage the ears, a shield having its medial portion extending across the front of the frame, a pivotal connection between the medial portion of the shield and the frame, said pivotal connection securing the shield against disengagement from the frame but permitting limited play at the pivotal connection, the ends of the shield being adapted to curve rearwardly around the ends of the frame and alongside the ear-pieces, and means at the rearwardly curved shield ends for releasably holding said curved shield ends in position alongside the ear-pieces.

10. In combination, a supporting frame adapted to extend across the face adjacent the eyes and having hinged ear-pieces at its ends adapted to engage the ears, a shield supported on the frame and projecting outwardly and downwardly in front of the upper portion thereof with the ends of the shield curving rearwardly alongside the frame and lying inside the ear-pieces and resting upon the frame at its hinged connections with the ear-pieces, the curved ends of the shield having shoulders adapted to hook under the ear-pieces, and reinforcements at said shoulders having bent ends pressing against the shoulders for outwardly bowing the same for ready hooked engagement beneath the ear-pieces.

In testimony whereof we have affixed our signatures.

GEORGE R. HANNAN.
RUTHERFORD G. GOLDMAN.